US007089419B2

(12) United States Patent
Foster et al.

(10) Patent No.: US 7,089,419 B2
(45) Date of Patent: Aug. 8, 2006

(54) CONTROL FUNCTION WITH MULTIPLE SECURITY STATES FOR FACILITATING SECURE OPERATION OF AN INTEGRATED SYSTEM

(75) Inventors: Eric M. Foster, Owego, NY (US); William E. Hall, Clinton, CT (US); Marcel-Catalin Rosu, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 812 days.

(21) Appl. No.: 10/125,115

(22) Filed: Apr. 18, 2002

(65) Prior Publication Data

US 2003/0200453 A1   Oct. 23, 2003

(51) Int. Cl.
*H04L 9/00* (2006.01)
*G06F 12/14* (2006.01)
(52) U.S. Cl. .................................. 713/166; 713/189
(58) Field of Classification Search ................ 713/166, 713/189, 2
See application file for complete search history.

(56) References Cited

U.S. PATENT DOCUMENTS

| | | | |
|---|---|---|---|
| 4,168,396 A | 9/1979 | Best | 178/22 |
| 4,465,901 A | 8/1984 | Best | 178/22.08 |
| 4,797,853 A | 1/1989 | Savage et al. | 364/900 |
| 4,920,483 A | 4/1990 | Pogue et al. | 364/200 |
| 5,144,659 A | 9/1992 | Jones | 380/4 |
| 5,251,304 A * | 10/1993 | Sibigtroth et al. | 726/29 |
| 5,421,006 A | 5/1995 | Jablon et al. | 395/575 |
| 5,440,713 A | 8/1995 | Lin et al. | 395/485 |
| 5,464,087 A | 11/1995 | Bounds et al. | 194/200 |
| 5,491,827 A | 2/1996 | Holtey | 395/800 |
| 5,561,817 A | 10/1996 | McCormack et al. | 395/842 |
| 5,602,536 A | 2/1997 | Henderson et al. | 340/825.31 |
| 5,647,017 A | 7/1997 | Smithies et al. | 382/119 |
| 5,703,952 A | 12/1997 | Taylor | 380/44 |
| 5,757,919 A | 5/1998 | Herbert et al. | 380/25 |
| 5,778,316 A | 7/1998 | Persson et al. | 455/434 |

(Continued)

OTHER PUBLICATIONS

Evans et al., pending U.S. Appl. No. 10/125,527, entitled "Control Function Employing A Requesting Master ID And A Data Address To Qualify Data Access Within An Integrated System", co-filed herewith.

(Continued)

*Primary Examiner*—Emmanuel L. Moise
*Assistant Examiner*—Ali Abyaneh
(74) *Attorney, Agent, or Firm*—William H. Steinberg, Esq.; Kevin P. Radigan, Esq.; Heslin Rothenberg Farley & Mesiti, P.C.

(57) ABSTRACT

A technique is provided for facilitating secure operation of an integrated system. The technique includes passing a request for data through a data access controller incorporated within the integrated system, and selectively qualifying the request in accordance with a security state of the controller. The security state of the controller is one state of multiple possible security states, including a null state and a secured state. In the secured state, the controller replaces a standard boot code address associated with a request for boot code with a substitute boot code address. The substitute boot code address addresses an encrypted version of boot code, which is then decrypted by the controller employing a master key set held at the controller. When transitioning to the null state, the master key set is erased.

16 Claims, 14 Drawing Sheets

U.S. PATENT DOCUMENTS

| | | | | |
|---|---|---|---|---|
| 5,809,230 | A | 9/1998 | Pereira | 395/186 |
| 5,825,878 | A | 10/1998 | Takahashi et al. | 380/4 |
| 5,841,868 | A | 11/1998 | Helbig, Sr. | 380/25 |
| 5,893,921 | A | 4/1999 | Bucher et al. | 711/146 |
| 5,912,453 | A | 6/1999 | Gungl et al. | 235/492 |
| 5,918,007 | A | 6/1999 | Blackledge, Jr. et al. | 395/186 |
| 5,935,247 | A | 8/1999 | Pai et al. | 713/200 |
| 5,940,513 | A | 8/1999 | Aucsmith et al. | 380/25 |
| 6,021,476 | A | 2/2000 | Segars | 711/163 |
| 6,023,510 | A | 2/2000 | Epstein | 380/25 |
| 6,052,763 | A | 4/2000 | Maruyama | 711/152 |
| 6,101,543 | A | 8/2000 | Alden et al. | 709/229 |
| 6,116,402 | A | 9/2000 | Beach et al. | 194/216 |
| 6,119,226 | A * | 9/2000 | Shiau et al. | 713/2 |
| 6,182,142 | B1 | 1/2001 | Win et al. | 709/229 |
| 6,182,217 | B1 | 1/2001 | Sedlak | 713/172 |
| 6,226,742 | B1 | 5/2001 | Jakubowski et al. | 713/170 |
| 6,230,269 | B1 | 5/2001 | Spies et al. | 713/182 |
| 6,275,931 | B1 * | 8/2001 | Narayanaswamy et al. | 713/2 |
| 6,311,255 | B1 | 10/2001 | Sadana | 711/152 |
| 6,859,535 | B1 * | 2/2005 | Tatebayashi et al. | 380/201 |
| 2002/0059144 | A1 * | 5/2002 | Meffert et al. | 705/51 |
| 2002/0136410 | A1 * | 9/2002 | Hanna | 380/277 |
| 2002/0163522 | A1 * | 11/2002 | Porter et al. | 345/533 |
| 2002/0170050 | A1 * | 11/2002 | Fiorella et al. | 717/168 |
| 2003/0097583 | A1 * | 5/2003 | Lacan et al. | 713/200 |

OTHER PUBLICATIONS

Foster et al., pending U.S. Appl. No. 10/125,708, entitled "Control Function Implementing Selective Transparent Data Authentication Within An Integrated System", co-filed herewith.

Foster et al., pending U.S. Appl. No. 10/691,632, entitled "Initializing, Maintaining, Updating And Recovering Secure Operation Within An Integrated System Employing A Data Access Control Function", co-filed herewith.

S. Weingart, "Physical Security Devices for Computer Subsystems: A Survey of Attacks and Defenses", Proceedings of Cryptographic Hardware and Embedded Systems—CHES 2000, Second International Workshop, Worcester, MA, USA, Aug. 17-18, 2000, pp. 1-14.

C. Jutla, "Encryption Modes with Almost Free Message Integrity", Proc. Eurocrypt 2001, pp. 529-544, LNCS 2045.

D. Lie, et al., "Architectural Support for Copy and Tamper Resistant Software", ASPLOS-IX 2000, ACM 0-89791-88-6/97/05, Cambridge, Massachusetts USA.

* cited by examiner

| 500 | NULL | INITIALIZE | SECURED | TRIGGERED |
|---|---|---|---|---|
| ACCESS TABLE | DISABLED | ENABLED | ENABLED | BLOCKED |
| MASTER KEY SET | RESET | ACTIVE | ACTIVE | RESET |
| SUBSTITUTE BOOT ADDRESS | RESET | INACTIVE | ACTIVE | INACTIVE |
| DEBUG AND TEST | ENABLED | ENABLED | DISABLED | DISABLED |
| TAMPER DETECTION | DISABLED | ENABLED | ENABLED | TRIGGERED |
| TAMPER RESPONSE | DISABLED | DISABLED | ENABLED | TRIGGERED | fig. 5

CONTROL FUNCTION WITH MULTIPLE SECURITY STATES FOR FACILITATING SECURE OPERATION OF AN INTEGRATED SYSTEM

CROSS-REFERENCE TO RELATED APPLICATIONS

This application contains subject matter which is related to the subject matter of the following applications, each of which is assigned to the same assignee as this application and filed on the same day as this application. Each of the below listed applications is hereby incorporated herein by reference in its entirety:

"CONTROL FUNCTION EMPLOYING A REQUESTING MASTER ID AND A DATA ADDRESS TO QUALIFY DATA ACCESS WITHIN AN INTEGRATED SYSTEM", by Evans et al., U.S. Pat. No. 6,851,056, issued Feb. 1. 2005;

"CONTROL FUNCTION IMPLEMENTING SELECTIVE TRANSPARENT DATA AUTHENTICATION WITHIN AN INTEGRATED SYSTEM", by Foster et al., U.S. Ser. No. 10/125,708, filed Apr. 18, 2002, published on Oct. 23, 2002 as U.S. Pat. Publication No. US 2003/020048-A1; and "INITIALIZING, MAINTAINING, UPDATING AND RECOVERING SECURE OPERATION WITHIN AN INTEGRATED SYSTEM EMPLOYING A DATA ACCESS CONTROL FUNCTION", by Foster et al., U.S. Pat. No. 6,715,085, issued Mar. 20, 2004.

TECHNICAL FIELD

This invention relates generally to data request handling and transfer of data within an integrated system, and more particularly, to a technique for facilitating secure operation of an integrated system by incorporating an access control function therein which qualifies data access based on a security state of the control function.

BACKGROUND OF THE INVENTION

Multiple master functions are today being commonly integrated onto a single system chip. When initially defining an architecture for the integration of multiple discrete components onto a single chip, access to external devices can be an issue. For example, an MPEG video decoder system often employs external memory for various data areas, or buffers such as frame buffers. This external memory is conventionally implemented using either DRAM or SDRAM technology.

Two approaches are typical in the art for accessing off-chip devices. In a first approach, each on-chip functional unit is given access to the needed external device(s) through a data bus dedicated to that particular unit. Although locally efficient for accessing the external device, globally within the integrated system this approach is less than optimal. For example, although each function will have complete access to its own external memory area, there is no shared access between functions of the integrated system. Thus, transferring data from one memory area to another memory area of the system is often needed. This obviously increases the number of data transfers and can degrade performance of the overall system, i.e., compared with a shared memory system.

Another approach is to employ a single common bus within the integrated system which allows one or more functional units of the system to communicate to external devices through a single port. Although allowing the sharing of devices, one difficulty with this approach concerns controlling access to content or other sensitive data in the integrated system. For example, when using a large common memory pool in an integrated design, it becomes difficult to prevent unauthorized access to protected memory spaces, such as compressed data supplied by a transport demultiplexer to a decoder of a set-top box. This is especially true for a system where the programming interface is open and outside development is encouraged. Each of the functional masters should be able to access the memory space and it is not possible to differentiate whether an access is from a trusted master or an outside request, e.g., coming through an untrusted or open master.

In addition, when working with a system-on-chip design with multiple functional masters using shared memory, it is desirable to provide a mechanism for protecting the data from unauthorized access, particularly when the data comprises the device's system programming code. More particularly, facilitating initialization of a secure operating environment begins by ensuring that the system code is secure and performs the functions intended. In order to guarantee a secure operating environment, therefore, the integrated system should be activated or booted in a secure mode.

In view of the above, a need exists in the art for an enhanced access control approach for an integrated system. More particularly, a need exists for an access control function which facilitates initialization of a secure operating environment within an integrated system.

SUMMARY OF THE INVENTION

The shortcomings of the prior art are overcome and additional advantages are provided through the provision of a method for facilitating secure operation of an integrated device. The method includes: passing a request for data through a data access controller; and selectively qualifying the request for data passing through the access controller in accordance with a security state of the controller, wherein the security state comprises one state of multiple possible security states.

In another aspect, a method of fabricating an integrated device to facilitate secure operation thereof is provided. This method includes: providing, by a device manufacturer, an integrated device with a data access controller for selectively qualifying a request for data from a functional master within the integrated device, wherein the data access controller includes multiple possible security states, and wherein the providing includes initially providing the data access controller in a null state of the multiple possible security states; and assembling, by a system manufacturer, the integrated device into a computing environment, wherein the assembling includes writing a master key set and a substitute boot address to persistent storage within the data access controller of the integrated device for use in the selectively qualifying, and initiating transition of the data access controller to a secure state, the secure state comprising another state of the multiple possible security states.

Systems and computer program products corresponding to the above-summarized methods are also described and claimed herein.

Advantageously, provided herein is a technique for facilitating secure operation of an integrated system by controlling initialization of the system in accordance with a security state machine. The technique includes incorporation an access control function within the data flow path of the integrated system. The access control function includes the security state machine, as well as persistent storage containing secret information including a master key set and a substitute boot address for use in retrieving an encrypted version of boot code and subsequently decrypting the retrieved boot code prior to forwarding thereof to a requesting master within the integrated system. The technique presented ensures that device secrets can be controlled entirely by a system manufacturer and no secret information is required from other parties, such as an integrated device or integrated chip manufacturer. Development can be performed in a null state since the access control function and security state machine are non-intrusive, and do not require modifications to a master operation, i.e., other than initialization of an access table. Secret values stored on-chip can be erased if a tamper detection event occurs so that the information is not compromised. The selective use of a substitute boot address allows an ability to continue reliable operation even if the device is in the null state, and allows implementation of a subset of functionality (such as removing security related elements) or implementation of system recovery code from a null state.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 5 depicts one example of a security state table listing status of various system functions when the access control is in the different security states of FIG. 4, in accordance with an aspect of the present invention;

BEST MODE FOR CARRYING OUT THE INVENTION

Figure 1:
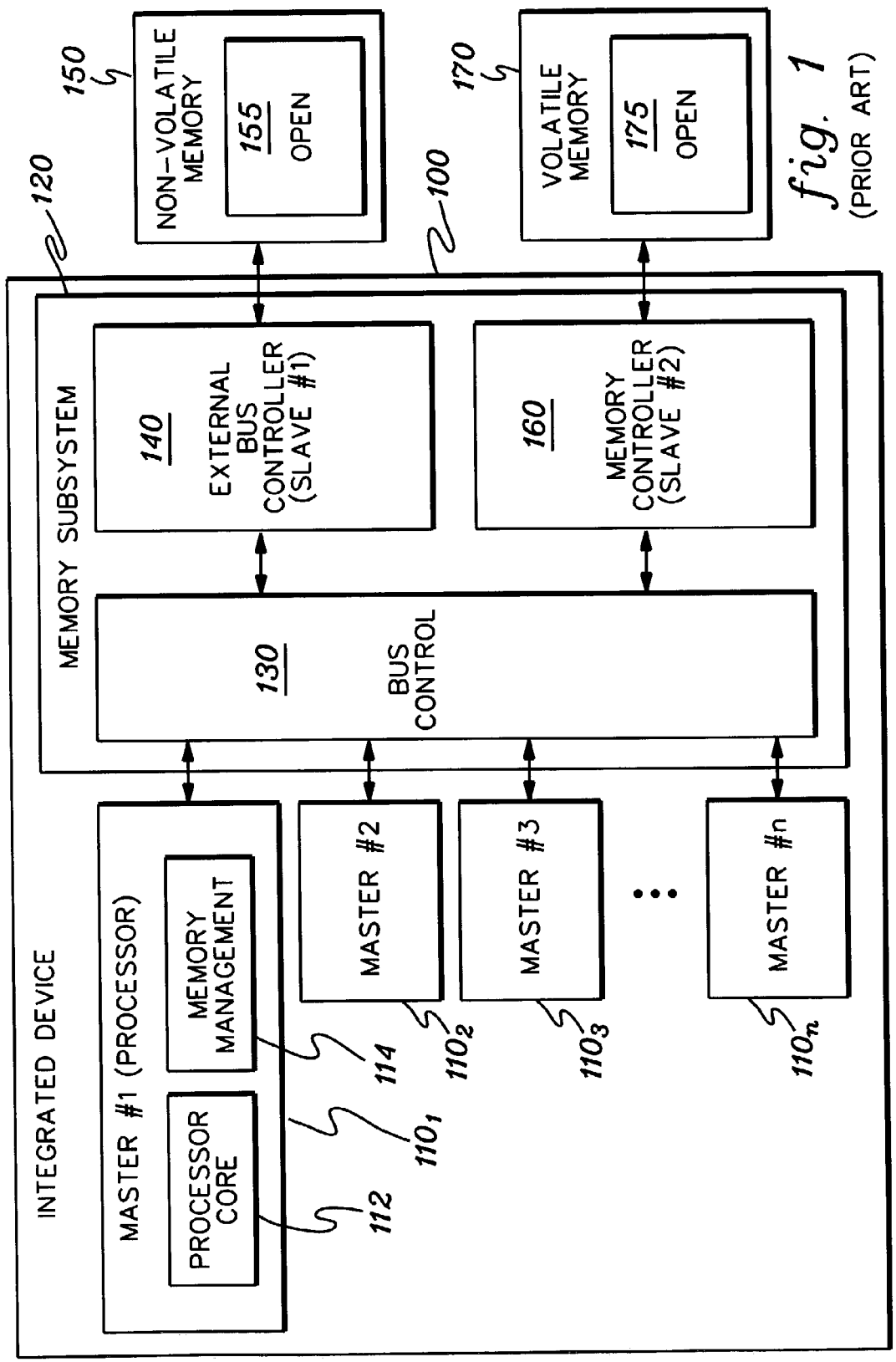
FIG. 1 depicts one example of a typical integrated device employing common memory access through a memory subsystem.

FIG. 1 depicts a conventional integrated device, generally denoted 100, having multiple internal functional masters $110_1, 110_2, 110_3 \ldots 110_n$. Master $110_1$ is shown as a processor, having a processor core 112 and a memory management unit 114. Internal masters $110_1, 110_2, 110_3 \ldots 110_n$ connect in this example to a memory subsystem 120, which includes bus control logic 130 of a shared bus. Those skilled in the art will understand that although shown within the memory subsystem, bus control 130 could alternatively reside outside of subsystem 120.

Bus control unit 130 coordinates and consolidates requests to slaves in the integrated device. For example, a first slave might comprise an external bus controller 140 which is connected to an external non-volatile memory 150, such as flash memory, having an open memory portion 155. A second slave, memory controller 160 connects to external volatile memory 170, such as SDRAM or DRAM. Memory 170 includes an open memory portion 175. In general, functions share a common memory pool in this integrated design in order to minimize memory costs, and to facilitate transfer of data between functions. As such, all internal masters have equal access to both non-volatile and volatile memory, and both storage spaces are labeled open, meaning that there are no limits on data access.

Typically, non-volatile memory is used for persistent storage, wherein data should be retained even when power is removed. This memory may contain the boot code, operating code, such as the operating system and drivers, and any persistent data structures. Volatile memory is used for session oriented storage, and generally contains application data as well as data structures of other masters. Since volatile memory is faster than non-volatile memory, it is common to move operating code to volatile memory and execute instructions from there when the integrated device is operational.

Note that in a typical system such as presented in FIG. 1, there are several security risks. Namely,

[1] The behavior of the processor can be controlled by modifying the operating code or data structures, and internal data or operation can be compromised.

[2] In certain cases, such as a communication controller, etc., an internal master can be controlled by an external source, and can be used to compromise internal code or data since memory is shared.

[3] Debug and development tools that are used in software development can be used to modify or monitor the processor's behavior.

[4] A given master can unintentionally corrupt or compromise the operation of another internal master since memory is shared.

The solution presented herein to the above-noted security risks involves providing an access control function disposed within the data path between the bus control and the slave devices. This access control function uses (in one embodiment) characteristics of the internal bus that connects the functional masters to the slave devices to allow each request for access to be further qualified based on a set of secure control information, and if desired, to be prevented. Advantageously, this access control function provides the ability to differentiate accesses by which master is making the data request, as well as where the data is stored, and then to either grant or limit access accordingly, or to otherwise qualify the access.

Figure 2:
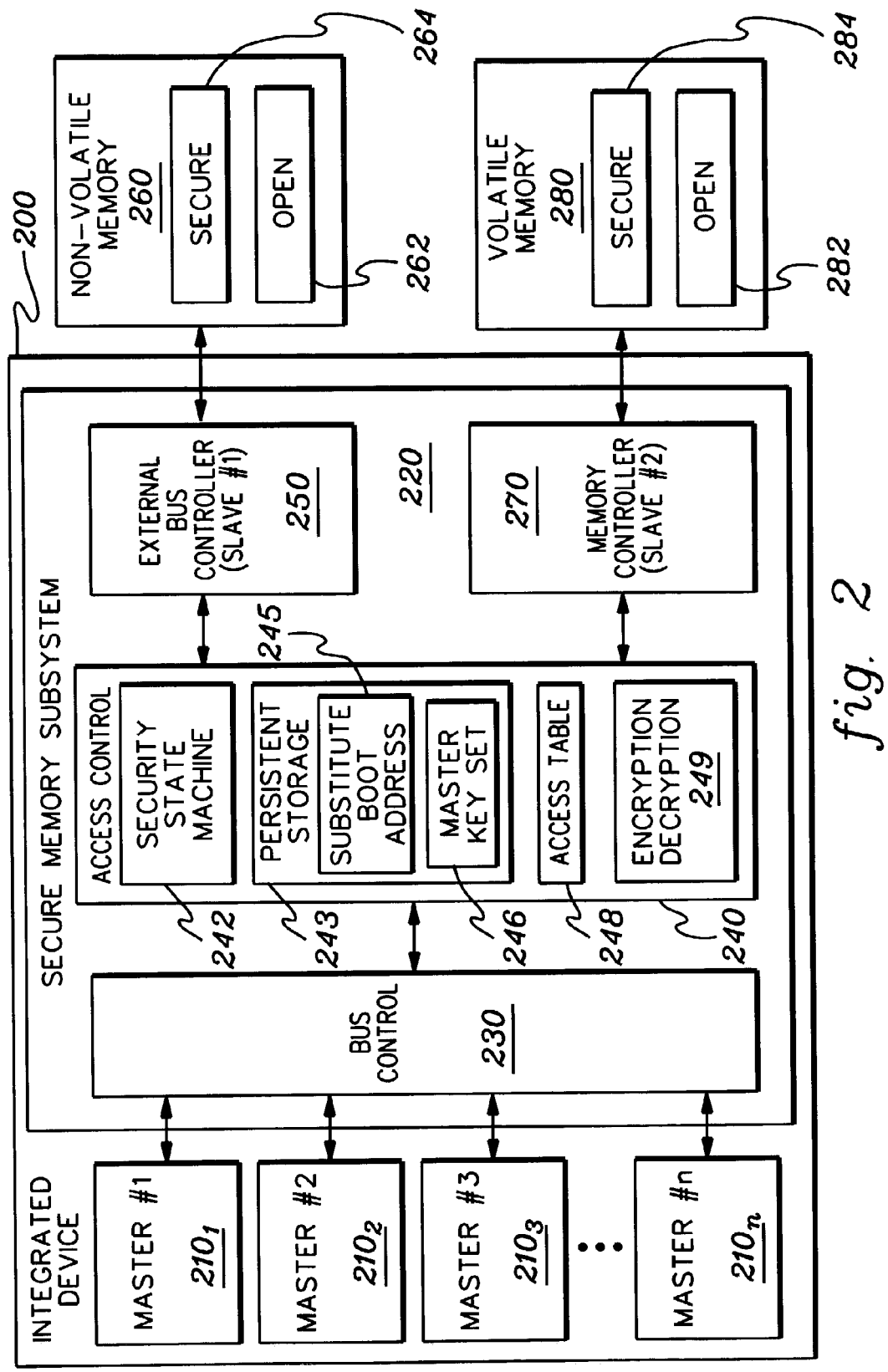
FIG. 2 depicts one embodiment of an access control function implemented within a secure memory subsystem of an integrated device, in accordance with an aspect of the present invention.

FIG. 2 illustrates one embodiment of a system, generally denoted 200, which includes an access control function 240 in accordance with an aspect of the present invention. System 200 again includes multiple functional masters $210_1 \ldots 210_n$ which communicate via a bus control 230 with one or more slaves 250 & 270. In this case, access control function 240 intercedes in the data path between bus control 230 and slaves 250 & 270. As an alternate embodiment, bus control unit 230 could reside outside of the secure memory subsystem unit. As shown, a first slave device comprises an external bus controller 250, and a second slave device comprises a memory controller 270. In this context, the combination of the bus control unit, access control unit and external controllers form the secure memory subsystem 220. As a result, the external address space defined as non-volatile memory 260 and volatile memory 280 can be further divided into open area 262 and secure area 264, as well as open area 282 and secure area 284, respectively. In this use, "secure" implies that masters $210_1 \ldots 210_n$ can only access a space as defined in the access control unit 240. Note that the access control function controls access events to both open and secure areas.

A detailed description of the access control function of unit 240 is included in the above-incorporated, copending application entitled "Control Function Employing A Requesting Master ID And A Data Address To Qualify Data Access Within An Integrated System". Further, the above-incorporated application describes in detail the use of an access table 248 and an encryption/decryption function 249 in qualifying requests for data based on an access level of the functional master requesting the data and the address of the data requested.

Briefly described, a request from a master granted control by the bus control unit is sent to the access control unit, along with the requested address and associated controls (e.g., read or write, etc.). The access table is used by the access control function to compare the requested address, master id, and read or write indicator to a definition of allowed access capability for that master. The given request can either be blocked (terminated), allowed in the clear, or allowed with encryption/decryption. If the requested transfer is allowable, then the bus signals are propagated to the slaves, and access parameters associated with the request based on the access table are sent to the encryption/decryption engine, i.e., if encryption/decryption is applicable. The encryption/decryption engine can be used to encrypt write data as the data is transferred to a given slave, or decrypt read data as the data is returned from a given slave using the associated access parameters.

In addition to the functions of qualifying data access based on the requesting master id and the address of the request, presented herein is the concept of adding a security state machine 242 to the access control function to, for example, control operation of the access table 248 and encryption/decryption function 249. On-chip storage 243 is also used in conjunction with the security state machine 242 to hold a substitute boot address 245 and a master key set 246. This storage is persistent in that values are retained even when general power is removed. As a result, once initialized, these values can be used from session to session until specifically reset or erased with a change in security state as described hereinbelow. Note that the presence of the master key in on-chip storage is independent of the existence of the security state machine.

Figure 3:
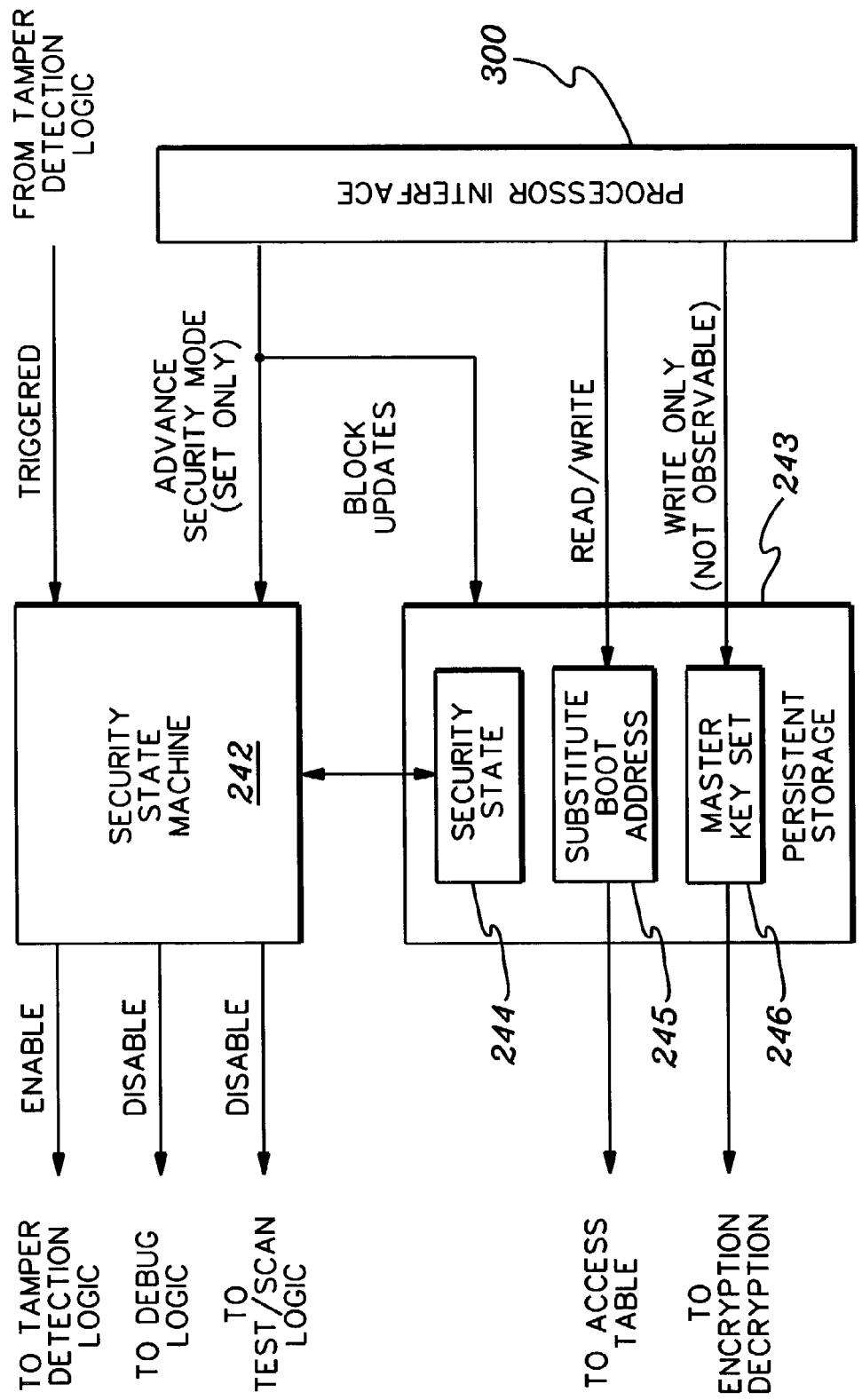
FIG. 3 depicts various inputs and outputs to the security state machine and persistent storage of the access control function of FIG. 2, in accordance with an aspect of the present invention.

FIG. 3 depicts in greater detail input and output signals of the security state machine 242 and on-chip persistent storage 243 of the access control function of FIG. 2. A processor interface 300 is also shown generically as the means of providing register control. Specifically, processor 300 is able to advance the security mode of the security state machine and to also write values for the master key set 246 and the substitute boot address 245. Note that the master key set is write only, and so once written cannot be further observed. Once the security mode is advanced by the processor, the security state machine 242 remains in a secured state. The security state 244 of the machine 242 is also held in persistent storage 243. The on-chip persistent storage provides the stored master key set to the encryption/decryption block of the access control unit, and the substitute boot address to the access table of the access control unit.

The security state machine 242 provides outputs to enable general tamper detection logic that will monitor system behavior for any attempt to make unauthorized access or modifications to system operation. Tamper detection techniques are well known in the industry. For example, reference an article by S. Weingart entitled "Physical Security Devices for Computer Subsystems: A Survey of Attacks and Defenses", published in the Proceedings of Cryptographic Hardware and Embedded Systems—CHES 2000, second international workshop, Worcester, Mass. (August 2000). Once enabled, the tamper detection logic will return a triggered signal to the security state machine if tampering is detected. The security state machine also provides outputs to disable both the debug logic and the test logic that are generally used in a complex device to facilitate system development and manufacturing test, respectively.

Figure 4:
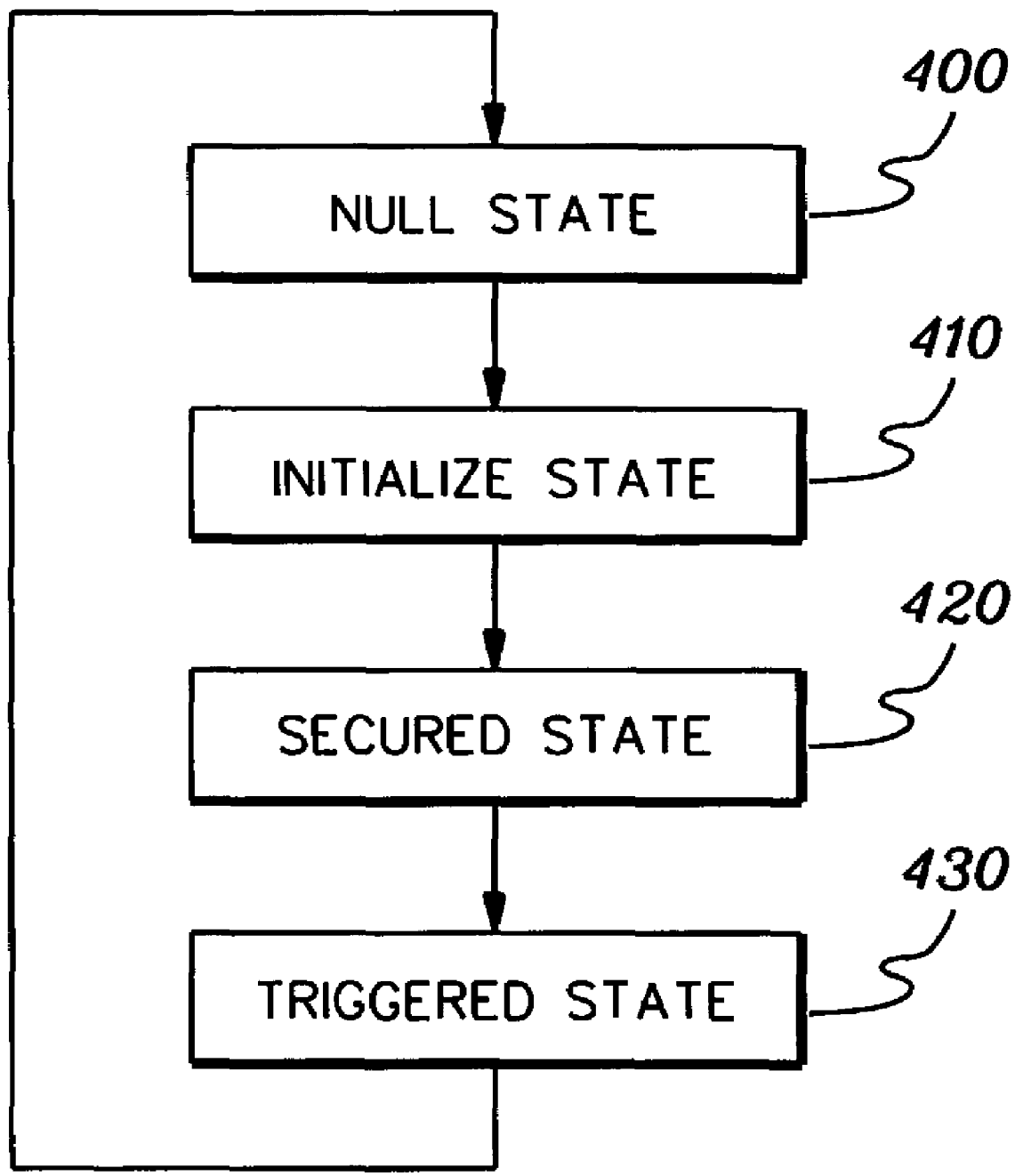
FIG. 4 depicts one example of the states of a security state machine employed by an access control function, in accordance with an aspect of the present invention.

FIG. 4 illustrates one example of four possible states of the security state machine. In one embodiment, the integrated device is provided by a device manufacturer in the null state 400, where the data access controller contains no secret information, and the device functions in a conventional manner. In a production environment, i.e., after completing all development activities, a system manufacturer assembles the integrated device into a system, advances the state machine to the initialize state through a processor write operation, and writes the master key set and substitute boot address into persistent storage of the access control.

The master key is selected by either the manufacturer or generated by the processor itself. In the latter case, the key may be optionally held in escrow. Note that these operations require the use of secret information and would be done under controlled circumstances. After the device is correctly configured, the system manufacturer enables the secured mode through a processor write operation, and once enabled, the secured state machine cannot be disabled except by returning to the null state.

As an alternative to the box or system manufacturer loading the master key set, the master key could be loaded by the box or system purchaser in certain scenarios. For example, a company may wish to make sure that its employees are running the company's standard "client for e-business" on their laptops, and the company does not wish to escrow the master keys for the laptops with the box or system manufacturer. In this case, the system owner could load the master key set, i.e., initialize the security state machine.

The initialize state is an interim state where the master key set can be used for encryption/decryption operations, but the substitute boot address is not invoked. The security state machine moves to the secured state 420 once enabled by a processor write operation.

The secured state is the mode for the final product that the end user will typically operate in. In this state, the secure functions of the access control unit are active. The device will continue to operate in this mode until a tamper, or trigger, event is indicated by tamper detection logic. Based on such a trigger, the security state machine transitions to the triggered state 430.

The triggered state is also an interim state where the on-chip persistent storage contents are erased and the device is no longer operating in a secure mode. By powering the device off and then back on, the security state machine returns to the original null state 400.

FIG. 5 depicts a security state table, generally denoted 500, which lists the operation of various aspects of the integrated device when in the different security states of FIG. 4.

When in the null state, the access table used in the access control function is disabled so that all external data requests are passed on to the slave functions without qualification (i.e., there is open access). The on-chip persistent storage contains no information and is in its reset state. The typical debug and test functions used during system development and manufacturing tests are operational, the tamper detection function is disabled, and any tamper event inputs are ignored.

When in the initialize state, the access table is active and is used to qualify external data requests. Note that if an entry is not explicitly listed in the table, it can be treated as an open access as long as it is within an allowable address range. As a result, entries can be added in a sequential fashion. The master key set is available and can be used as a valid key set for the encryption/decryption functions. The substitute boot address has been written into persistent storage but is not in active use since it is only used at boot time as described below; that is, the device must be rebooted in secure mode in order to invoke the substitute boot address. The debug and test functions remain enabled. The tamper detection function can be enabled, but the security state machine will not yet respond to tamper events.

When in the secured state, the access table remains active and the master key set remains available. In addition, the substitute boot address is also active and will only redirect boot instruction requests from the processor to the listed address until the access control table is enabled. The debug and test functions are disabled so that they cannot be used to observe or modify device behavior. The security state machine now accepts and responds to trigger input from the tamper detection logic.

When in the triggered state, all security processes are disabled or erased. Specifically, the access table is no longer used and all external data requests are blocked, and persistent storage contents have been erased or reset. The debug and test functions remain disabled, and the tamper detection input has been triggered (or set). Clocks can also be stopped.

Figure 6:
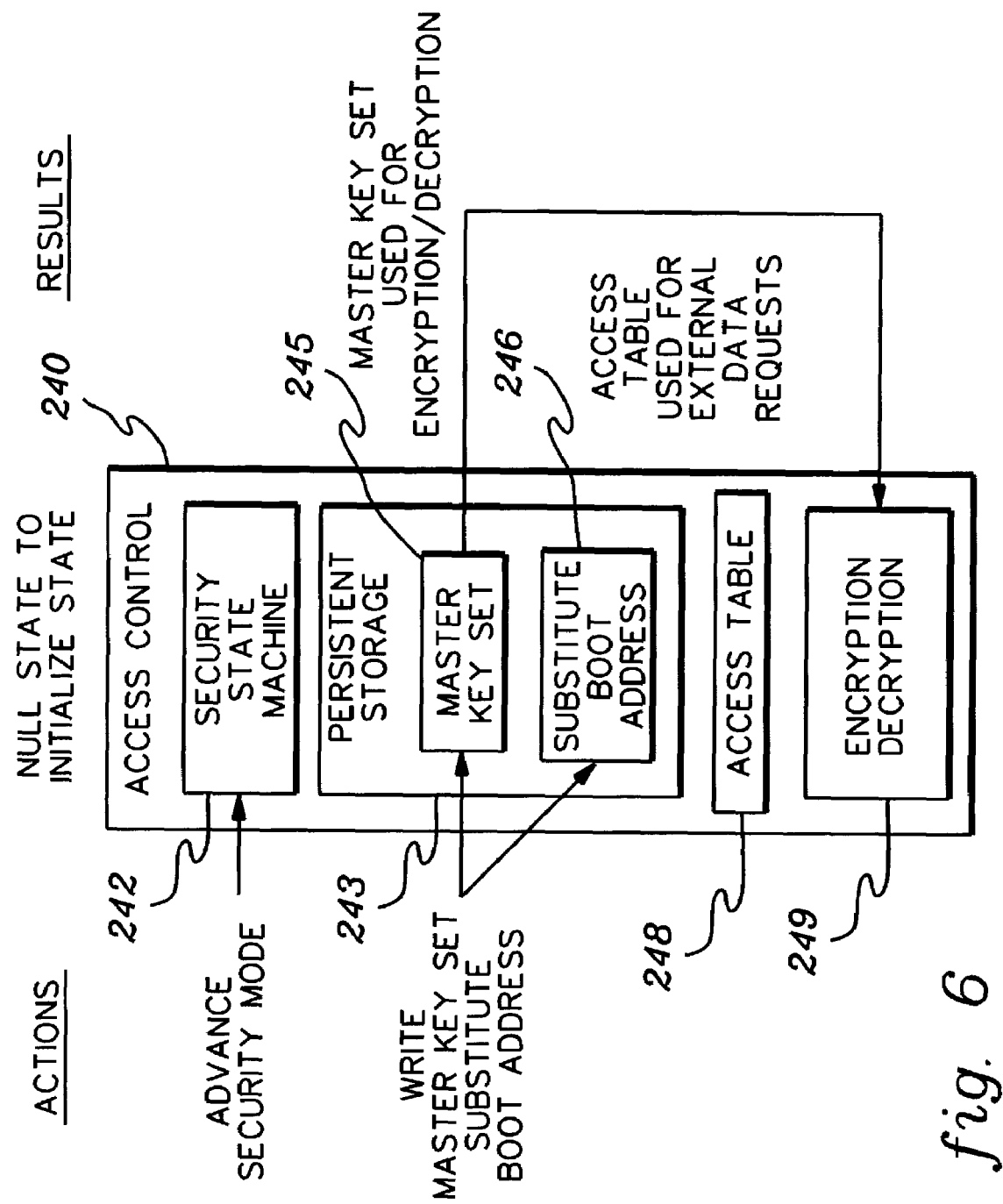
FIG. 6 depicts one example of actions and results when transitioning an access control function from a null state to an initialize state, in accordance with an aspect of the present invention.

FIG. 6 depicts actions and results when transitioning the state machine from a null state to an initialize state. This transition occurs when an advance security mode signal is input to the security state machine 242. In addition, a master key set 245 and a substitute boot address 246 are written into persistent storage 243. The result is that the master key set can be used for encryption/decryption functions 249, and the access table 248 may be loaded and enabled for use by all external data requests passing through the access control function.

Figure 7:
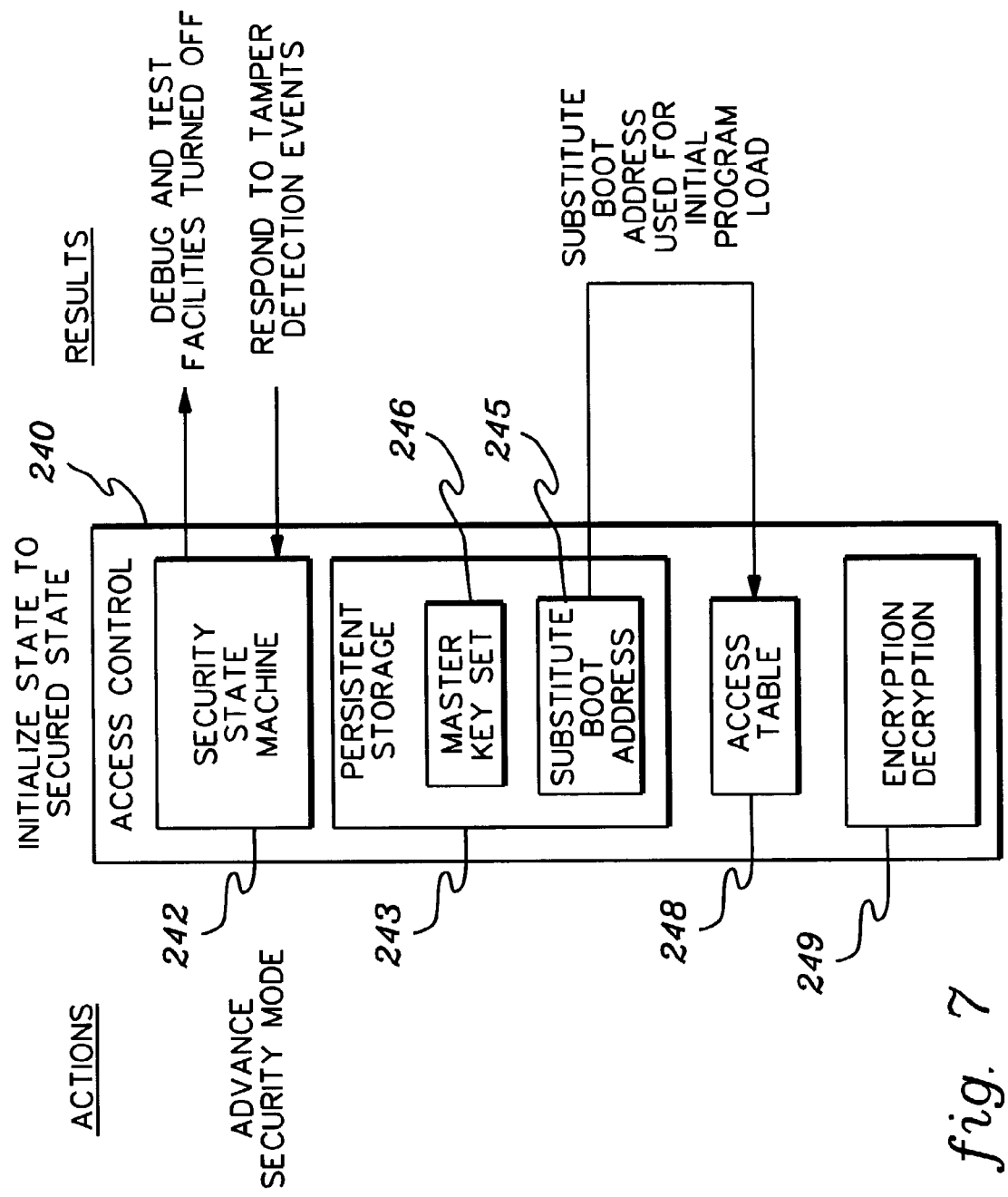
FIG. 7 depicts one example of actions and results when transitioning an access control function from an initialize state to a secured state, in accordance with an aspect of the present invention.

FIG. 7 depicts actions and results of transitioning from an initialize state to a secured state. Transition from the initialize state occurs when the same advanced security mode signal is again input to the security state machine. The result is that debug and test facilities are turned off, and the security state machine 242 will now respond to any tamper detection events. In addition, the substitute boot address 246 is used for initial program loads in order to access an encrypted version of boot code held in external memory, as explained further below in connection with FIGS. 10–14.

Figure 8:
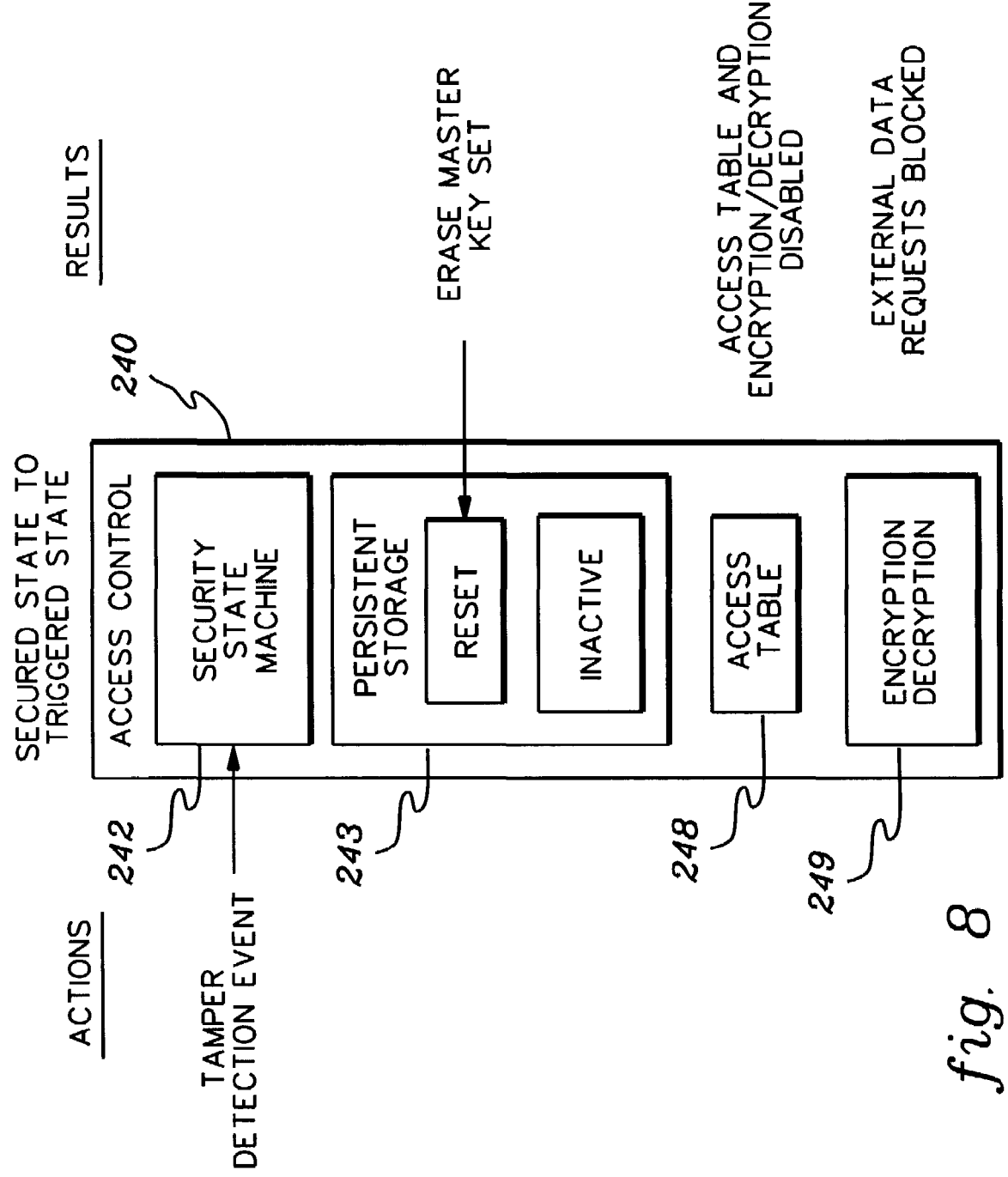
FIG. 8 depicts one example of actions and results when transitioning an access control function from a secured state to a triggered state, in accordance with an aspect of the present invention.

FIG. 8 depicts actions and results in transitioning from a secured state to a triggered state. The trigger action is detection of a tamper event which inputs a trigger signal to the security state machine 242; alternatively, software can force this with an advance security mode operation. The result is that the master key set is erased from persistent storage 243. In addition, the access table 248 and the encryption/decryption logic 249 are disabled, with all external data requests being blocked by the access control function. In addition, the system clocks can be stopped.

Figure 9:
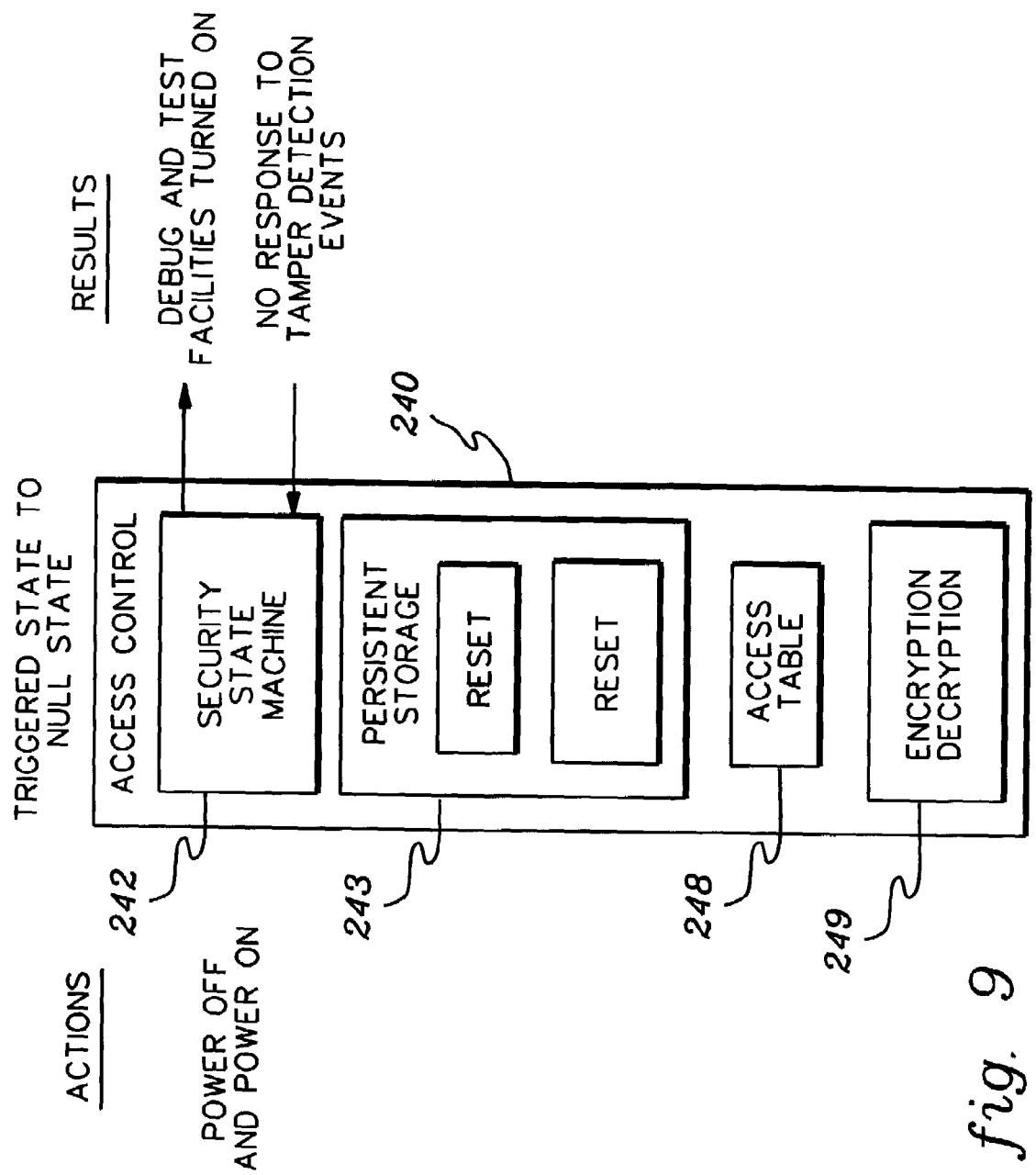
FIG. 9 depicts one example of actions and results when transitioning an access control function from a triggered state to a null state, in accordance with an aspect of the present invention.

FIG. 9 depicts actions and results in transitioning from a triggered state to the null state. The transition is initiated by turning the power to the device off and then back on. The result is that the debug and test facilities are turned on, and the security state machine does not respond to any tamper detection event. The persistent storage 243 remains reset, and the access table 248 and encryption/decryption logic 249 remain disabled.

Figure 10:
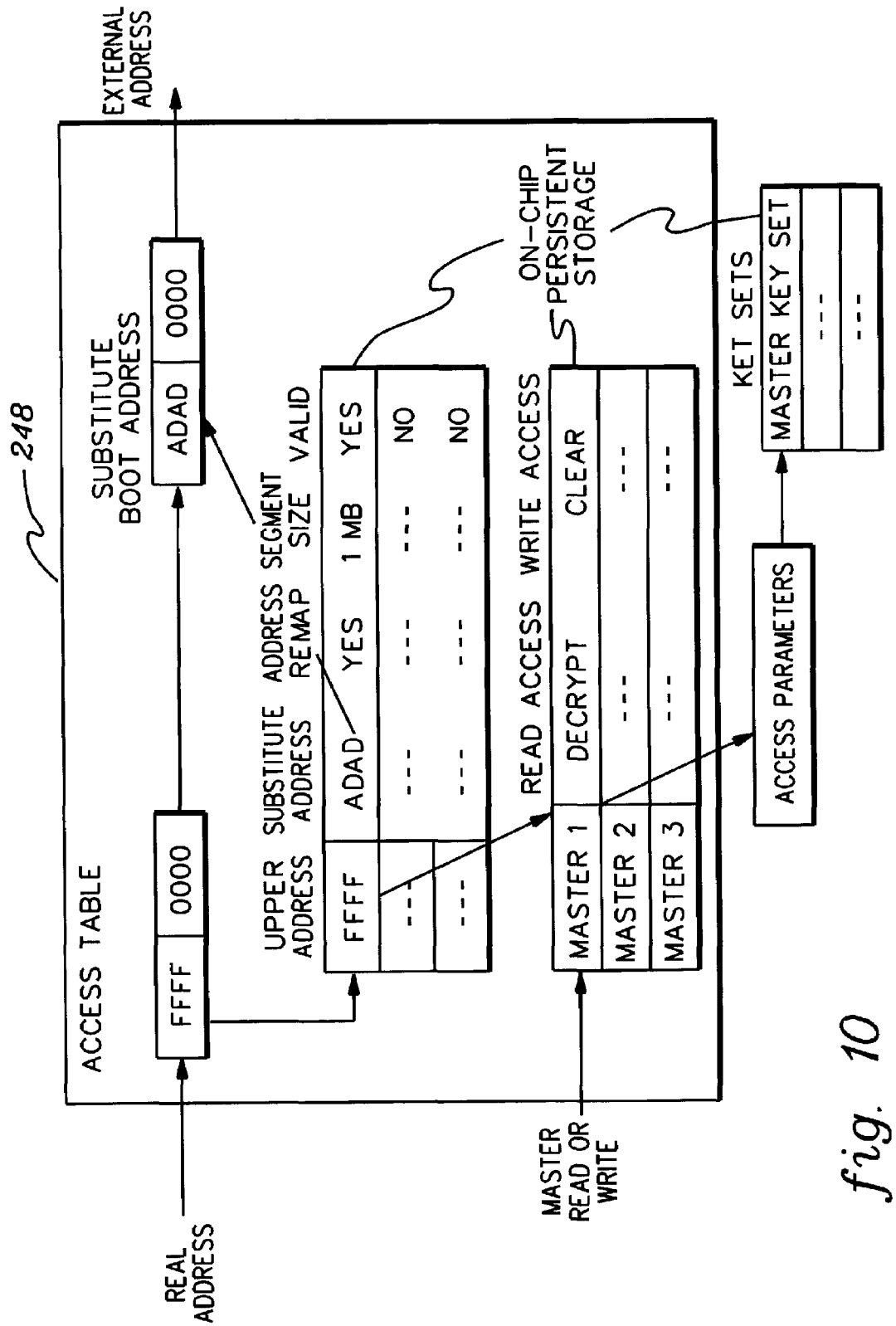
FIG. 10 depicts one example of an access table employed by the access control function of FIG. 2, in accordance with an aspect of the present invention.

FIG. 10 illustrates one possible embodiment for the persistent storage functions discussed above. As described in the above-incorporated application entitled "Control Function Employing A Requesting Master ID And A Data Address To Qualify Data Access Within An Integrated System", the access table and access parameters comprise a list of table entries which relate in part the real address of the external address request to a substitute address, as well as to an access level listed by master id and read/write operation. In general, these table entries cover the full address space of the software and other functions that are operating in the integrated device, and are stored in volatile memory so all values are lost between sessions. However, one entry of the table could be mapped to on-chip persistent storage that retains its value between sessions, and consequently would be available (and active) as soon as the integrated device powers on. Further, the address of the first instruction (boot code) that is requested by a processor are well defined, and a persistent table entry could be defined to translate this external data request to a separate external address. This is essentially the function of the substitute boot address.

In addition, each entry in the access table refers to a set of access parameters which in turn point to one (of multiple) key sets. As described for the access table, the access parameters and key sets are in general contained in volatile storage and lost between sessions, but one entry for the key sets could be mapped to on-chip persistent storage that retains its value. This mechanism could be used to store a master key set for use during initialization. The difference between the master key set and the other entries in the key sets table is that the master key set must be write only (i.e., cannot be directly read), while the others could be write only.

Figure 11:
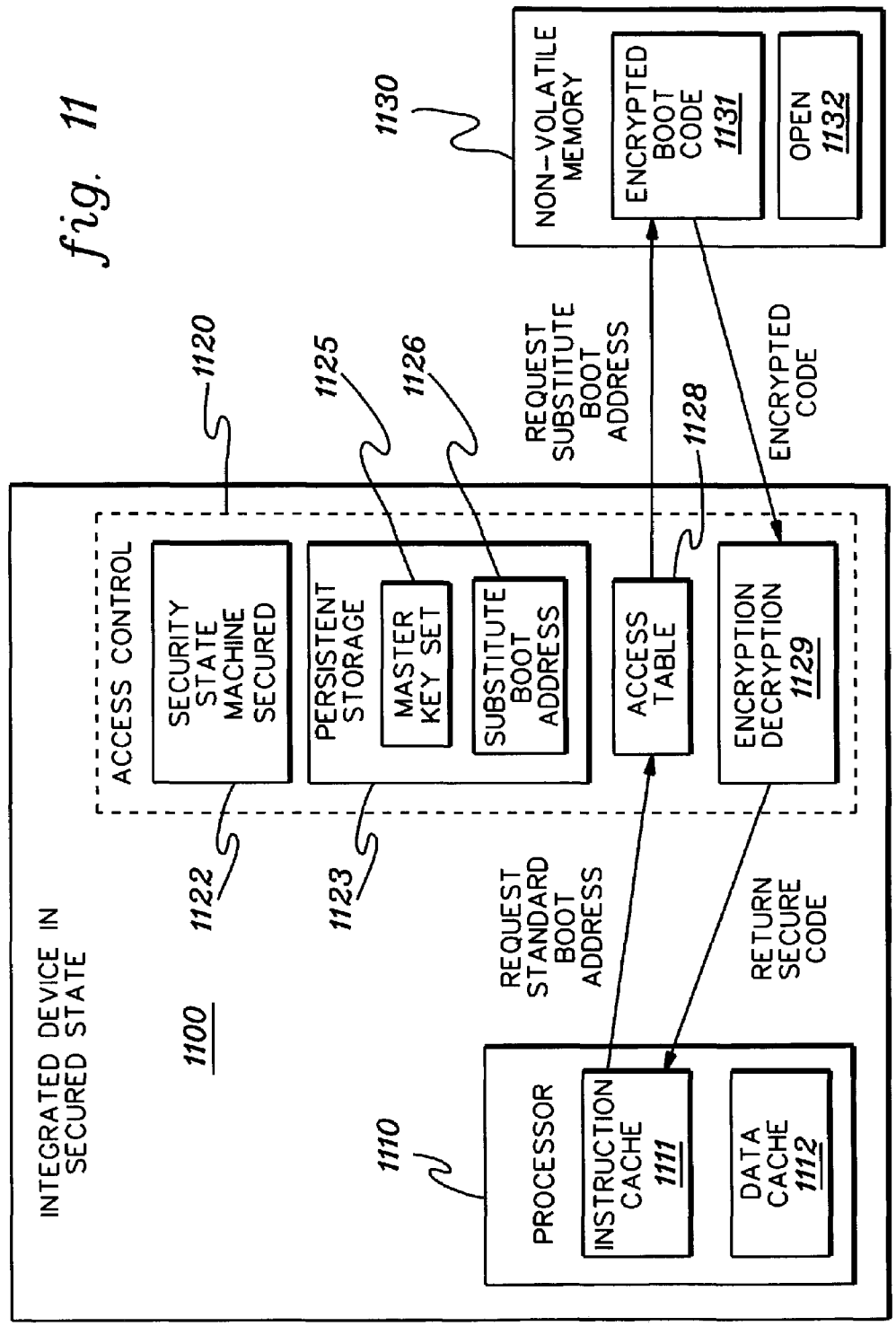
FIG. 11 depicts one example of initialization signals passing between components of an integrated system with an access control function in a secured state, in accordance with an aspect of the present invention.

FIG. 11 depicts one embodiment of an integrated device in a secured state in accordance with an aspect of the present invention. (Note that FIG. 11 and certain subsequent figures are a simplified depiction of the integrated system of FIG. 2, wherein the bus control and slave elements are omitted for clarity.) The integrated device 1100 is depicted with a processor master function 1110, having an instruction cache 1111 and a data cache 1112, and an access control 1120, which would reside between a bus control unit and slave devices as described above. Access control 1120 includes a security state machine in secured state 1122, and persistent storage 1123, which contains a master key set 1125 and a boot address 1126. Control 1120 also includes an access table 1128 and encryption/decryption function 1129. This figure illustrates how the substitute boot address is used in normal operation.

Operationally, when the main power for the device is turned on, a first action is processor 1110 requesting data (boot code) from a predefined address. This external data request is passed to the access control function, which will identify the request as a boot code request based on the address, and will replace all or part of the address with the substitute boot address that is contained in the persistent storage. The request will then continue on to external memory 1130 for retrieval of encrypted boot code 1131 which is in secure memory separate from open memory area 1132. Encrypted boot code 1131 has been previously encrypted using the master key set. The encrypted code is then returned to the access control unit which has been configured, based on the substitute boot address, to decrypt and return a clear, secure code using the master key set. This returned code is forwarded to the instruction cache 1111 within processor 1110 for execution.

The above steps could be repeated as the processor executes the boot code sequence.

FIG. 12 again depicts the integrated device 1100 of FIG. 11 in secured state. This figure illustrates the transition from secure code to open code that is not encrypted. As part of executing the boot code to provide a secure operating environment, processor 1110 will load the correct values into access table 1128 and associated access parameters for the particular operation of the device. Once initialized, the access control function will govern the external data requests of the system, and control can pass to the operating code contained in open (unencrypted) memory 1132. Alternatively, the entire kernel code could also be encrypted to provide privacy as well as integrity if desired. Similarly, other data could be encrypted for privacy and integrity and retrieved using substitute addresses as described herein.

Figure 12:
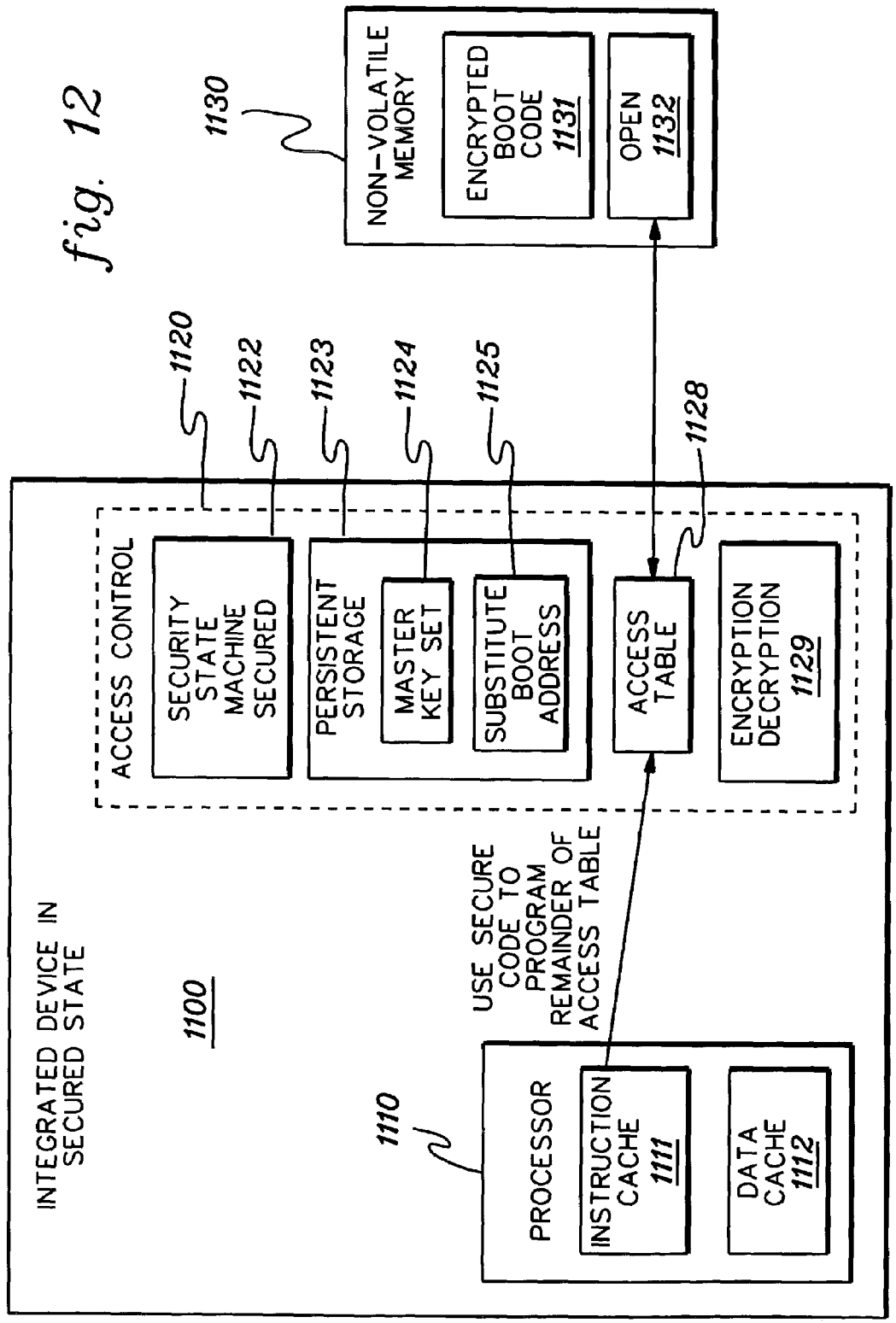
FIG. 12 depicts one example of the use of secure code to program a remainder of the access table of the access control function of FIG. 11, in accordance with an aspect of the present invention.

Note that in the embodiment described in FIGS. 11 & 12, the master key set in persistent storage is used for a minimal amount of encryption/decryption. Specifically, the master key set is used to decrypt encrypted boot code and provide a secure initialization environment. Once the integrated device is known to be trusted, the access table can be updated to provide a programmable dynamic run-time key for a given memory segment. This would still provide the protection of in-line encryption/decryption, but adds the flexibility of using a changing key value based on the application or session. This serves to reduce the exposure of the master key set. Further, keys can be changed based on the application so that even on a given integrated device, different applications can hide/protect their data from others. Note that dynamic run-time keys can still be saved from session to session by encrypting them and storing them as part of the code/data that is used to boot the system with the master key set.

Figure 13:
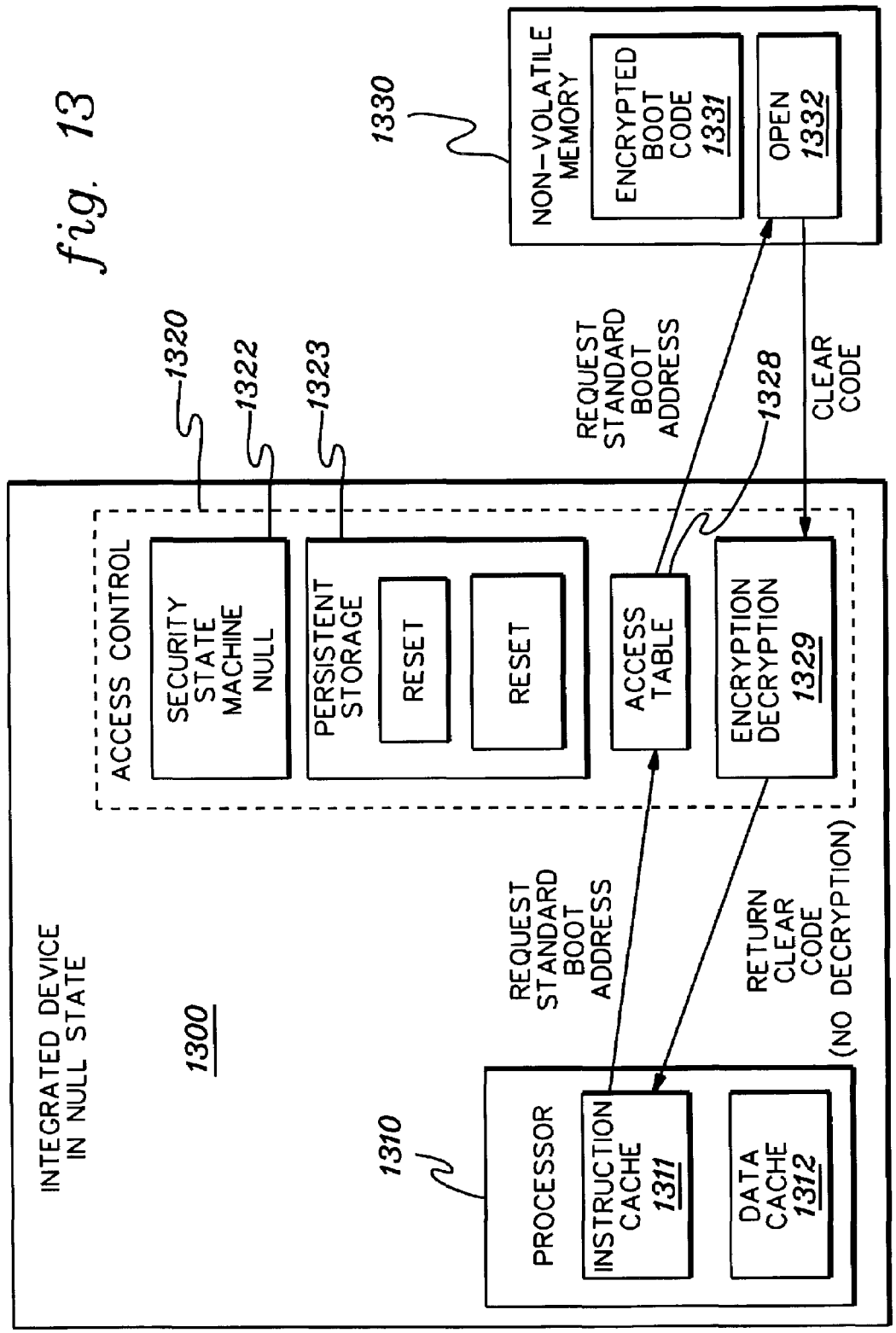
FIG. 13 depicts one example of initialization signals passing between components of an integrated system with an access control function in a null state, in accordance with an aspect of the present invention.

FIG. 13 depicts one embodiment of an integrated device 1300 in a null state. Device 1300 again includes a processor master function 1310 having an instruction cache 1311 and a data cache 1312, as well as an access control function 1320 for use in qualifying data requests to non-volatile memory 1330. The access control unit 1320 includes a security state machine in null state 1322, and persistent storage 1323 wherein the master key set and substitute boot address have been reset. Non-volatile memory 1330 includes the encrypted boot code 1331 in secure memory, and a clear recover code 1332 in open memory.

When in the null state, the substitute boot address and access table are disabled as described above. Consequently, an initial request of the processor is not translated to a substitute address and continues to the original memory location. Further, the decryption capabilities of the access control function are not invoked, so that the original memory location should be an open region of non-volatile memory.

Thus, although the device has been triggered, and has dropped into the null state, the device is still able to execute code reliably although no secret information or data associated with the secret information is accessible. The device can continue to operate at a reduced level of functionality, or can implement recovery code to restore its secure operation.

Figure 14:
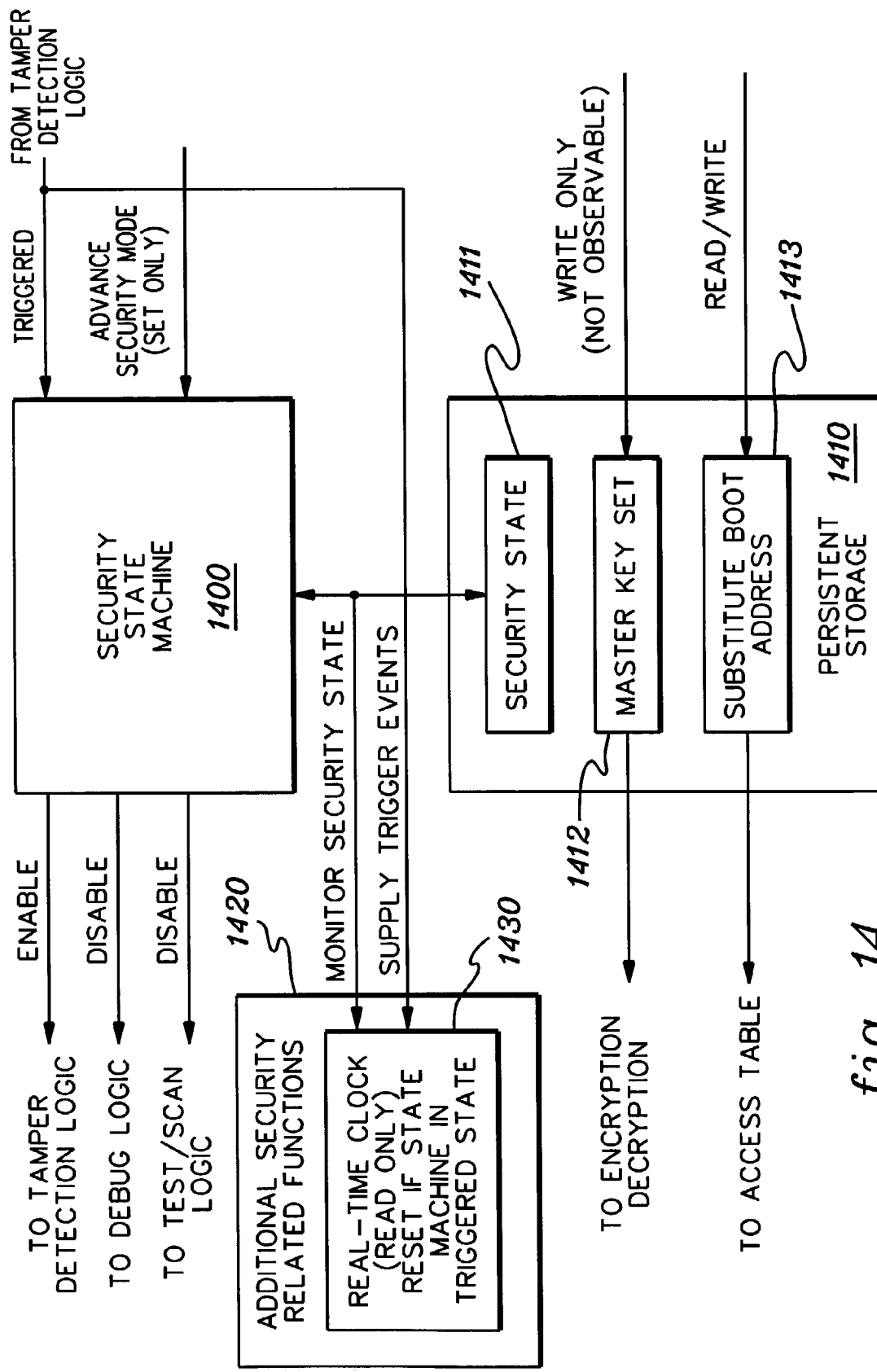
FIG. 14 depicts an alternate embodiment of inputs and outputs to a security state machine and persistent storage of an access control function, in accordance with an aspect of the present invention.

FIG. 14 illustrates that the security state machine can be used to control more than just the access control function. For example, a security state machine 1400 and associated persistent storage 1410 (having security state 1411, master key set 1412 and substitute boot address 1413 contained therein) could be used to govern the operation of other security-related elements 1420, such as a real-time clock 1430. A real-time clock is a common element in security schemes that associate a level of access or privilege with either elapsed or absolute time, such as being able to access data or content for a period of time or after a given time of day. This security state machine could be employed as an input to the real-time clock function so that it becomes active when in the secured state, and is unusable in the triggered and null states and can be blocked from updates. In addition, the real-time clock could be a source of tamper events to the tamper detection logic if its operation is disturbed. These same principles can be applied to other security-related elements in an integrated design.

Those skilled in the art will note that the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for facilitating secure operation of an integrated device chip, the method comprising:

initially programming a data access controller by a master of the integrated device chip for secure operation, wherein the data access controller and the master are both disposed within the integrated device chip;

after initial programming, passing a request for data through the data access controller;

selectively qualifying the request for data passing through the data access controller in accordance with a security state of the data access controller determined pursuant to at least one security parameter set during the initial programming of the data access controller by the master of the integrated device chip, wherein the security state of the data access controller comprises one state of multiple possible security states; and wherein the request for data comprises a request for boot code, and the security state comprises a secured state, and wherein the selectively qualifying includes:

replacing a standard boot code address associated with the request for boot code with a substitute boot code address held at the data access controller when in the secured state, wherein the substitute boot code address can be employed to access an encrypted version of boot code; and decrypting the encrypted version of boot code prior to return thereof to a functional master initiating the request for boot code.

2. The method of claim 1, wherein the decrypting includes employing a master key set held at the data access controller when in the secured state.

3. The method of claim 2, wherein an additional state of the multiple possible security states comprises a null state, and wherein the method further includes transitioning the security state of the data access controller to the null state responsive to tampering occuring with the integrated device or with a computing environment within which the integrated device resides, wherein the transitioning includes erasing the master key set from the data access controller, thereby inhibiting retrieval and decryption of the encrypted version of boot code.

4. The method of claim 3, wherein when the security state comprises the null state, the request for boot code is passed through the data access controller and accesses an open version of recovery code, wherein the open version of recovery code is different and functionally more limiting than the decrypted encrypted version of boot code obtained when the security state comprises the secured state.

5. The method of claim 1, wherein the request for data comprises a request for boot code, and wherein the selectively qualifying comprises providing an address of a version of boot code to be employed during initialization of the integrated device, the version of boot code to be employed during initialization being dependent on the security state of the data access controller.

6. A method of fabricating an integrated device chip to facilitate secure operation thereof, the method comprising:

providing, by a device manufacturer, an integrated device chip with a data access controller and master for selectively qualifying a request for data from a functional master within the integrated device chip, wherein the data access controller comprises multiple possible security states, and wherein the providing includes initially providing the data access controller in a null state of the multiple possible security states;

assembling, by a system manufacturer, the integrated device chip into a computing environment, wherein the assembling includes writing a master key set and a substitute boot address to persistent storage within the data access controller of the integrated device chip for use in the selectively qualifying, initially programming at least one security parameter for the data access controller by the master of the integrated device for secure operation, and initiating transition of the data access controller to a secured state determined pursuant to the at least one security parameter set during initial programming of the data access controller by the master of the integrated device chip, the secured state comprising another state of the multiple possible security states; and wherein when in the secured state, the data access controller selectively qualifies requests for data passing therethrough, and wherein when a request for data comprises a request for boot code, the selectively qualifying includes replacing a standard boot code address associated with the request for boot code with a substitute boot code address held by the data access controller, wherein the substitute boot code address can be employed to access an encrypted version of boot code, and decrypting the encrypted version of boot code prior of return thereof to a functional master of the integrated device initiating the request for boot code.

7. A system for facilitating secure operation of an integrated device chip, the system comprising:

means for initially programming a data access controller by a master of the integrated device chip for secure operation, wherein the data access controller and the master are both disposed within the integrated device chip;

means for passing a request for data through the data access controller, the data access controller receiving the request for data from a functional master of the integrated device chip;

wherein the data access controller comprises means for selectively qualifying the request for data received by the data access controller in accordance with a security state of the data access controller determined pursuant to at least one security parameter set during the initial programming of the data access controller by the master of the integrated device chip, wherein the security state of the data access controller comprises one state of multiple possible security states; and wherein the request for data comprises a request for boot code, and the security state comprises a secured state, and wherein the means for selectively qualifying includes:

means for replacing a standard boot code address associated with the request for boot code with a substitute boot code address held at the data access controller when in the secured state, wherein the substitute boot code address can be employed to access an encrypted version of boot code; and means for decrypting the encrypted version of boot code prior to return thereof to a functional master initiating the request for boot code.

8. The system of claim 7, wherein the means for decrypting includes means for employing a master key set held at the data access controller when in the secured state.

9. The system of claim 8, wherein an additional state of the multiple possible security states comprises a null state, and wherein the system further includes means for transitioning the security state of the data access controller to the null state responsive to tampering occuring with the integrated device or with a computing environment within which the integrated device resides, wherein the means for transitioning includes means for erasing the master key set from the data access controller, thereby inhibiting retrieval and decryption of the encrypted version of boot code.

10. The system of claim 9, wherein when the security state comprises the null state, the request for boot code is passed through the data access controller and accesses an open version of recovery code, wherein the open version of recovery code is different and functionally more limiting than the decrypted encrypted version of boot code obtained when the security state comprises the secured state.

11. The system of claim 7, wherein the request for data comprises a request for boot code, and wherein the means for selectively qualifying comprises means for providing an address of a version of boot code to be employed during initialization of the integrated device, the version of boot code to be employed during initialization being dependent on the security state of the data access controller.

12. At least one program storage device readable by a machine, tangibly embodying at least one program of instructions executable by the machine to perform a method for facilitating secure operation of an integrated device chip, the method comprising:

initially programming a data access controller by a master of the integrated device chip for secure operation, wherein the data access controller and the master are both disposed within the integrated device chip;

after initial programming, passing a request for data through the data access controller;

selectively qualifying the request for data passing through the data access controller in accordance with a security state of the data access controller determined pursuant to at least one security parameter set during the initial programming of the data access controller by the master of the integrated device chip, wherein the security state of the data access controller comprises one state of multiple possible security states;

wherein the request for data comprises a request for boot code, and the security state comprises a secured state, and wherein the selectively qualifying includes:

replacing a standard boot code address associated with the request for boot code with a substitute boot code address held at the data access controller when in the secured state, wherein the substitute boot code address can be employed to access an encrypted version of boot code; and decrypting the encrypted version of boot code prior to return thereof to a functional master initiating the request for boot code.

13. The at least one program storage device of claim 12, wherein the decrypting includes employing a master key set held at the data access controller when in the secured state.

14. The at least one program storage device of claim 13, wherein an additional state of the multiple possible security states comprises a null state, and wherein the method further includes transitioning the security state of the data access controller to the null state responsive to tampering occuring with the integrated device or with a computing environment within which the integrated device resides, wherein the transitioning includes erasing the master key set from the data access controller, thereby inhibiting retrieval and decryption of the encrypted version of boot code.

15. The at least one program storage device of claim 14, wherein when the security state comprises the null state, the request for boot code is passed through the data access controller and accesses an open version of recovery code, wherein the open version of recovery code is different and functionally more limiting than the decrypted encrypted version of boot code obtained when the security state comprises the secured state.

16. The at least one program storage device of claim 12, wherein the request for data comprises a request for boot code, and wherein the selectively qualifying comprises providing an address of a version of boot code to be employed during initialization of the integrated device, the version of boot code to be employed during initialization being dependent on the security state of the data access controller.

* * * * *